(12) United States Patent
McMullen

(10) Patent No.: US 9,605,728 B2
(45) Date of Patent: Mar. 28, 2017

(54) ADJUSTABLE BODY MOUNT

(71) Applicant: Zhongli North America Inc., Troy, MI (US)

(72) Inventor: Bryan McMullen, Leonard, MI (US)

(73) Assignee: Zhongli North America, Inc., Troy, MI (US)

( * ) Notice: Subject to any disclaimer, the term of this patent is extended or adjusted under 35 U.S.C. 154(b) by 2 days.

(21) Appl. No.: 14/688,231

(22) Filed: Apr. 16, 2015

(65) Prior Publication Data
US 2015/0298745 A1    Oct. 22, 2015

Related U.S. Application Data

(60) Provisional application No. 61/980,159, filed on Apr. 16, 2014.

(51) Int. Cl.
| | | |
|---|---|---|
| *F16M 13/00* | (2006.01) | |
| *F16F 15/08* | (2006.01) | |
| *F16F 3/087* | (2006.01) | |
| *B62D 24/02* | (2006.01) | |
| *F16F 1/373* | (2006.01) | |

(52) U.S. Cl.
CPC ............ *F16F 15/08* (2013.01); *B62D 24/02* (2013.01); *F16F 1/3735* (2013.01); *F16F 3/0873* (2013.01)

(58) Field of Classification Search
CPC . F16F 3/0873; B60G 99/004; B60G 2204/44; B62D 27/04; Y10T 403/60
USPC ................. 248/632, 635; 267/141.4, 140.4; 267/141.1–141.7
See application file for complete search history.

(56) References Cited

U.S. PATENT DOCUMENTS

| | | | | |
|---|---|---|---|---|
| 2,520,757 A | * | 8/1950 | Cain ..................... | F16F 1/3732 248/632 |
| 2,658,710 A | * | 11/1953 | Titus ....................... | F16F 1/362 267/141.7 |
| 2,838,339 A | | 6/1958 | Schaldenbrand | |
| 2,976,080 A | | 3/1961 | Moore | |
| 3,032,370 A | | 5/1962 | Moore | |
| 3,193,237 A | * | 7/1965 | Adams .................. | F16F 1/3732 267/141.4 |
| 3,218,101 A | * | 11/1965 | Adams .................. | F16B 5/0258 267/141 |
| 3,675,881 A | | 7/1972 | Caldwell | |
| 3,809,427 A | * | 5/1974 | Bennett ................ | B60G 99/004 267/141 |
| 4,263,998 A | * | 4/1981 | Moriya ................. | F16D 13/752 192/110 R |
| 4,298,193 A | * | 11/1981 | Mourray .............. | B60G 15/068 267/220 |
| 4,783,039 A | * | 11/1988 | Peterson ............... | F16F 3/0873 248/634 |
| 4,921,203 A | * | 5/1990 | Peterson .............. | B60G 99/004 248/635 |
| 5,170,985 A | * | 12/1992 | Killworth ............ | B60G 99/004 248/634 |

(Continued)

*Primary Examiner* — Kimberly Wood
(74) *Attorney, Agent, or Firm* — Dinsmore & Shohl LLP

(57) ABSTRACT

A body mount includes a mounting bracket with a cup portion, an isolation portion, and a tube that extends through the cup portion of the mounting bracket. The isolation assembly that has a lower portion which extends between and interconnects the cup portion of the mounting bracket to the tube. The tube has a recessed portion.

15 Claims, 2 Drawing Sheets

(56) References Cited

U.S. PATENT DOCUMENTS

| | | | |
|---|---|---|---|
| 5,219,439 A | 6/1993 | Moore et al. | |
| 6,062,763 A * | 5/2000 | Sirois | B62D 27/04 |
| | | | 248/635 |
| 6,364,296 B1 | 4/2002 | Cummings et al. | |
| 6,419,215 B1 | 7/2002 | Johnson et al. | |
| 7,163,200 B2 * | 1/2007 | Dickson | F16F 1/3735 |
| | | | 248/635 |
| 7,261,365 B2 * | 8/2007 | Dickson | B60G 99/002 |
| | | | 248/635 |
| 7,389,977 B1 | 6/2008 | Fernandez et al. | |
| 7,503,552 B2 | 3/2009 | Huprikar et al. | |
| 7,785,054 B2 * | 8/2010 | Parisi | B60R 11/00 |
| | | | 296/35.1 |
| 8,167,283 B2 | 5/2012 | Huprikar et al. | |
| 8,246,021 B2 | 8/2012 | Shand et al. | |
| 8,308,148 B2 | 11/2012 | Shand | |
| 8,511,656 B2 * | 8/2013 | Yahata | F16F 1/3842 |
| | | | 248/635 |
| 2005/0073166 A1 | 4/2005 | Snyder | |
| 2006/0202101 A1 | 9/2006 | Dickson et al. | |
| 2009/0102218 A1 | 4/2009 | Fernandez et al. | |

* cited by examiner

ADJUSTABLE BODY MOUNT

CROSS-REFERENCE TO RELATED APPLICATIONS

This application claims the benefit of U.S. Provisional Application No. 61/980,159 filed Apr. 16, 2014, the content of which is incorporated herein by reference.

FIELD OF THE INVENTION

The present disclosure relates to mount bushings for isolating vibration and taking a load. Specifically, the disclosure relates to body mounts which connect and support a vehicle body to a vehicle frame.

BACKGROUND OF THE INVENTION

Known body mounts generally include a puck or block type apparatus made of rubber or other elastic material that is bolted between a vehicle frame and the vehicle body. The elastic material of the apparatus dampens noise and vibration between the frame and body. One such example is shown in U.S. Pat. No. 3,675,881 to Caldwell.

Room for improvement in mount bushings exists insofar as a mount bushing that allows for flexible manufacturing and facilitates design changes, such as altering the mount to adjust the distance between the vehicle frame and the vehicle body, is desirable.

SUMMARY OF THE INVENTION

A body mount of the present disclosure includes a mounting bracket configured to mount to a frame of a vehicle. The mounting bracket has a cup portion. The mounting bracket further includes an inner portion configured to mount to a vehicle body. The inner portion includes a tube that extends through the cup portion of the mounting bracket. The tube includes an outer main portion and an outer recessed portion. The body mount further includes an isolation assembly that has a lower portion which extends between and interconnects the cup portion of the mounting bracket to the tube of the inner portion and an upper portion which surrounds the tube of the inner portion and is disposed above the lower portion.

DETAILED DESCRIPTION OF THE DRAWINGS

Figure 2:
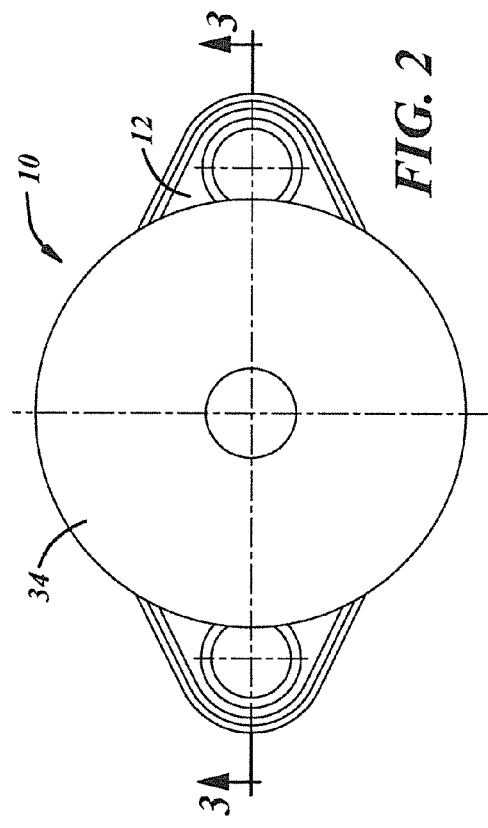
FIG. 2 is a top plan view of the body mount.
Figure 3:
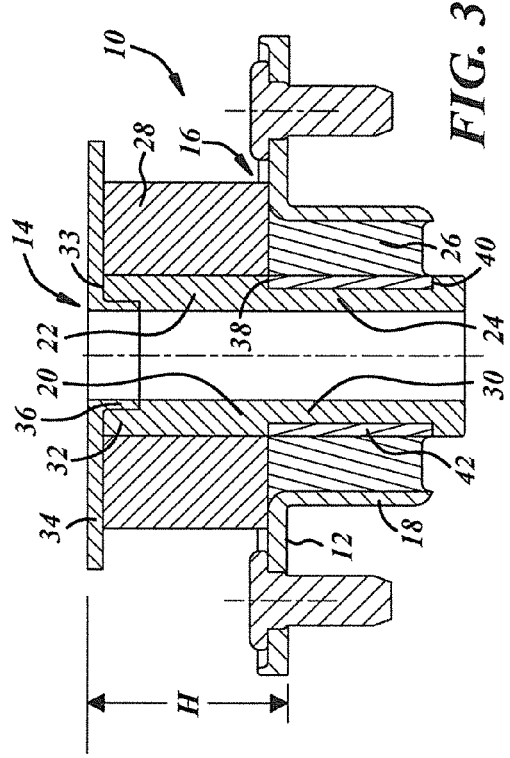
FIG. 3 is a cross-sectional view along line 3-3 of the body mount.
Figure 1:
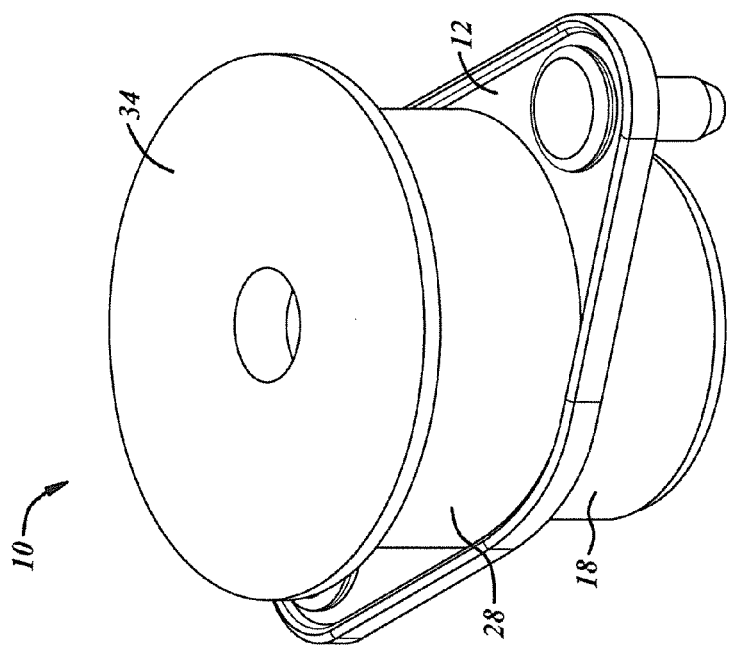
FIG. 1 is a perspective view of a body mount.

Through the following description one skilled in the art will recognize that the present disclosure provides a more robust and versatile body mount by enabling a body mount which can be easily adapted to various configurations of vehicle frame to vehicle body distances.

With reference now to the figures, a body mount 10 includes a mounting bracket 12, an inner portion 14, and an isolation assembly 16. The mounting bracket 12 is configured to mount to the frame of a vehicle and has a cup portion 18. The inner portion 14 is configured to mount to the body of the vehicle. The inner portion 14 includes a tube 20 extending through the cup portion 18 of the mounting bracket 12. The tube 20 includes an outer main portion 22 and an outer recessed portion 24. The isolation assembly 16 has a lower portion 26 extending between and interconnecting the cup portion 18 of the mounting bracket 12 and the tube 20 of the inner portion 14. The isolation assembly 16 also includes an upper portion 28 disposed above the lower portion 26. The upper portion 28 surrounds the tube 20 of the inner portion 14.

The mounting bracket 12 has mounting flanges which extend radially and include holes to receive mounting studs or other fasteners known to those skilled in the art. The mounting flanges help to configure the mounting bracket 12 to be secured to a frame of a vehicle. The mounting bracket 12 may be made of metal, such as a stamped steel. The holes for the mounting brackets may be punched or machined. As will be clear to those of skill in the art, the mounting bracket may take a variety of shapes and forms depending on the application and how the mounting plate is attached to the frame.

The cup portion 18 of the mounting bracket 12 is generally tubular and circular in cross section with an open top and open bottom. The length of the vertical sides of the tubular shape define a height of the cup portion 18.

The tube 20 has a general shape of a hollowed-out cylinder featuring differing and various inner and outer diameters along the length of the tube 20. In addition to the outer main portion 22 and the outer recessed portion 24, the tube 20 also includes an inner main portion 30 and an inner recessed portion 32. The inner recessed portion 32 has a larger diameter than inner main portion 30. The inner recessed portion 32 is located at a top edge 33 of the tube 20. As shown, the tube 20 of the inner portion 14 is disposed inside the cup portion 18 of the mounting bracket 12, with the outer surface of the tube 20 spaced from an inner surface of the cup portion 18. The tube 20 and cup portion 18 are coaxial with one another. The tube 20 is substantially longer than the cup portion 18 and extends a short distance beyond the lower end of the cup portion 14 and a substantial distance beyond the top of the cup portion 14. The tube 20 may be made of metal, for example from rolled steel which is machined to shape.

In addition to the tube 20, the inner portion 14 includes an end washer 34. The end washer 34 includes a protruding center portion 36. The end washer 34 is disposed at the end of the tube 20 abutting the top edge 33 such that a center hole of the end washer 34 aligns with hollow center of the tube 20. The protruding center portion 36 is seated within the inner recessed portion 32. In the illustrated embodiment, the inner portion 14 is a two piece design with the end washer 34 being a separate piece from the tube 20. Alternatively, they may be formed as one piece, or may have configurations other than as illustrated. The inner portion 14 connects to a body of the vehicle.

The outer main portion 22 of the tube 20 has a larger diameter than the outer recessed portion 24 of the tube 20. The outer recessed portion 24 is bounded by a top edge 38 of the outer recessed portion 24 on one end, and a bottom edge 40 of the outer recessed portion 24 on an opposite end. The distance between the top edge 38 of the outer recessed portion 24 and the bottom edge 40 of the outer recessed portion 24 defines the height of the outer recessed portion 24. The height of the outer recessed portion 24 is generally equal to the height of the cup portion 18.

A tube ring 42 is disposed around the outer recessed portion 24. The tube ring 42 is sized such that the tube ring 42 snaps in to place around the outer recessed portion 24.

The tube ring 42 has a hollow cylinder shape, and is made from plastic, or any other suitable material known to those skilled in the art.

The isolation assembly 16 is disposed between the inner portion 14 and the mounting bracket 12 so as to interconnect the inner portion 14 and mounting bracket 12 while providing some vibration isolation between the inner portion 14 and the mounting bracket 12. In the illustrated embodiment, the isolation assembly 16 includes the lower portion 26 and the upper portion 28.

The lower portion 26 is disposed inside the cup portion 18 of the bracket 12, and surrounds the tube 20. The tube ring 42 is bonded to the inner surface of the lower portion 26 and is used to connect the lower portion 26 to the tube 20. The connection between lower portion 26 and the tube 20 is achieved by the tube ring 42 snapping into place around the outer recessed portion 24, as discussed above. The height of the lower portion 26 is equal to the height of the recessed portion 24 and the cup portion 18. The lower portion 26 of the isolation assembly 16 is rubber that is also bonded to the cup portion 18, although other suitable materials known to those skilled in the art may be used.

The upper portion 28 surrounds the tube 20, and is located above the lower portion 26, the cup portion 18, and below a lower surface of the end washer 34 of the inner portion 14. The upper portion 28 is formed of MCU, or microcellular polyurethane. MCU is a urethane that has small "microcellular" bubbles or voids in the body of urethane material. The type of urethane and the quantity and size of the microcellular voids may be chosen so as to provide a desirable combination of spring rate and damping rate. However, MCU does not tolerate high loads. If a body of MCU is exposed to a compression load above a certain level, the MCU is irreparably damaged and the spring rate and/or damping rate is modified. This makes the use of MCU in chassis components difficult, since these components may see very high loads when the vehicle experiences a large impact from rough roads or off-road use. If the MCU composition is chosen so as to provide the desired characteristics under normal inputs, corresponding to roads that are smooth or have moderate irregularities, this composition may not tolerate the higher loads that the vehicle may periodically experience.

The combination of rubber for the lower portion 26 and MCU for the upper portion 28 provides additional opportunity for tuning of the body mount 10. Additionally, the rubber of the lower portion 30 may act to limit the total load on the MCU upper portion, avoiding an overload. Alternative versions may use the same material for the upper and lower portions 26, 28 or different types of the same material. For example, one of the portions 26, 28 may be one type of rubber and the other may be a different type of rubber. In some versions, the upper portion 28 is a separately molded rubber piece. The upper portion 28 may also be more than one piece, such as stacked pieces of the same or different material. The body mount 10 is illustrated as having a cup portion and isolation assembly 16 that are circular in cross section. Other shapes may be used. Additionally, either portion of the isolation assembly 16 may have voided areas therein to provide desired rates.

The height H of the mount is indicated as the distance between the lower surface of the flanges of the mounting bracket 12 and the upper surface of the end washer 34. The disclosed body mount 10 allows for modification in the height of the body mount 10 in a manner that is less complicated and/or costly than traditional mounts.

If the height of the mount is to be changed, this can be accomplished in several ways. First, a new tube 20 and upper portion 28 may be provided with a different height. This requires a change in only two parts rather than the overall design.

The height may also be adjusted by changing the tube 20 or the upper portion 28 independently of the other. In some examples, the upper portion 28 is preloaded by the inner portion 14 or by a fastener disposed through the tube 20 to attach the upper portion to the vehicle body. That is, the upper portion 28 of the isolation assembly 16 has a static height that is taller than illustrated in the assembled view of the figures. When the inner portion 14 is assembled into the remainder of the mount or the mount is assembled to the vehicle, the upper portion 28 of the isolation assembly is compressed to a new height. If the inner tube 20 is changed such that it has a different distance between the top edge 38 of the outer recessed portion 24 and the top edge 33 of the tube 20, the amount of preload on the upper portion 28 may be changed, thereby affecting the height of the body mount 10. Predetermining this distance allows for tuning a body mount 10 to better fit into a known vehicle body and frame assembly. For example when a vehicle is changed, the body mount height 10 may also need to be changed. Alternatively, the same tube 20 may be used and the upper portion 28 may be changed so that the assembled height is different.

Figure 4:
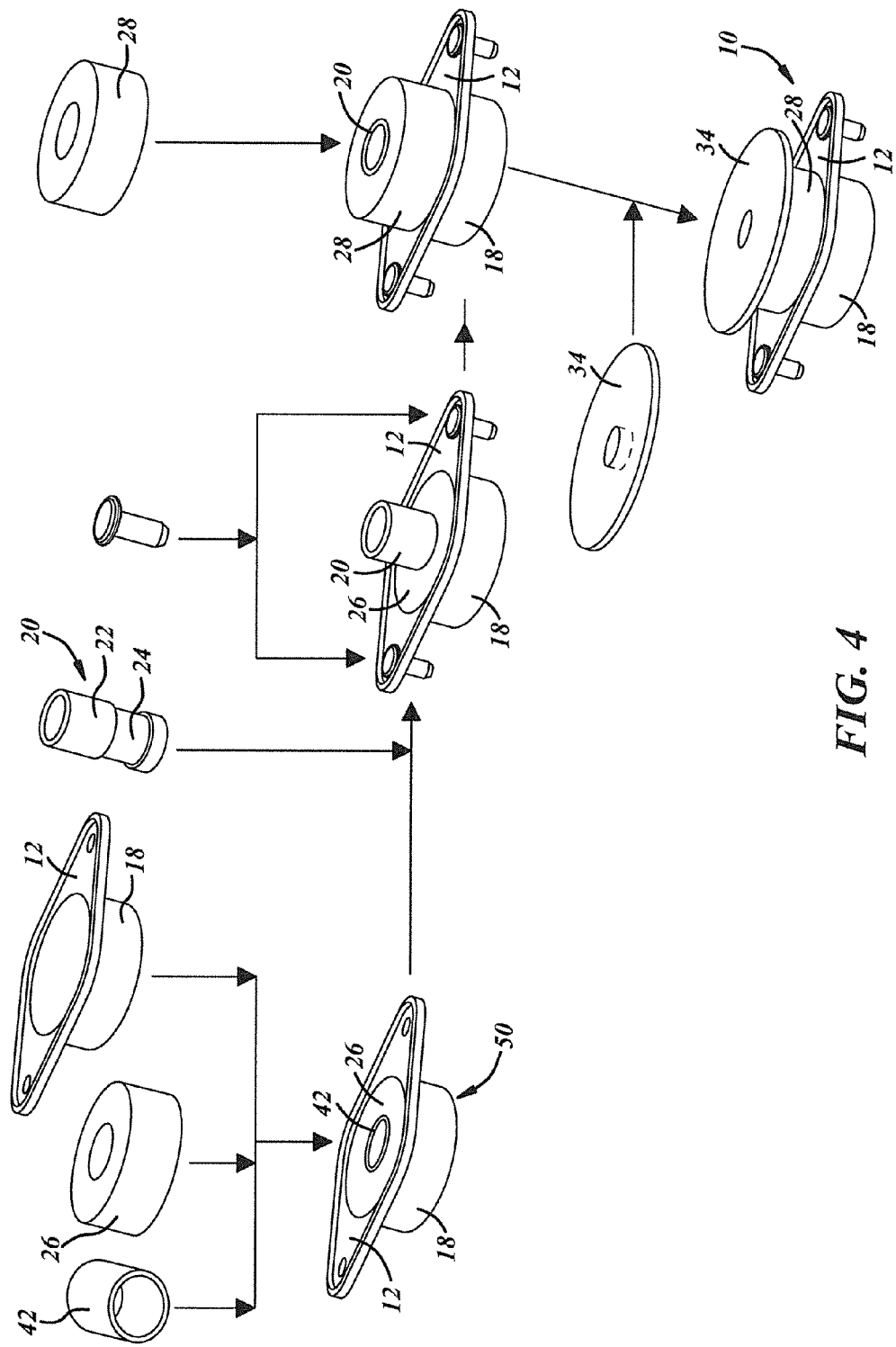
FIG. 4 is an exploded perspective view of the body mount.

Referring now to FIG. 4, an exemplary manufacturing process for the exploded body mount 10 will be described. The tube ring 42 is molded and then treated so as to prepare it for mold bonding. In the illustrated example, the preparation is through grit blasting, primer, and adhesive. In alternative versions, the tube may be formed of a material other than plastic. The mounting bracket 12 may be formed in various ways, such as die casting or stamping. It is also prepared and then the tube ring 42 and mounting bracket 12 are mold bonded together with a material such as rubber. This creates a lower assembly 50. The inner tube 20 is formed, such as by machining. The tube 20 is pressed into the tube ring inside the assembly 50. The upper portion 28 of the isolation assembly 16 is positioned over the tube 20. Finally, the end washer 34, which may be a cold formed washer, is positioned onto the top end of the tube 20. Those of skill in the art will recognize that the mount 10 may be formed in other ways.

The body mount described and illustrated herein may be altered in various ways without departing from the scope or teaching of the present invention. It is the following claims, including all equivalents, which define the scope of the invention.

The invention claimed is:

1. A body mount comprising:

a mounting bracket configured to mount to the frame of a vehicle, the mounting bracket having a cup portion;

an inner portion configured to mount to a vehicle body, the inner portion including a tube extending through the cup portion of the mounting bracket, the tube including an outer main portion and an outer recessed portion, the tube further including an inner main portion and an inner recessed portion, the inner recessed portion located at an end of the tube;

an end washer, the end washer including a protruding center portion, the protruding center portion disposed within the inner recessed portion of the tube; and an isolation assembly having a lower portion extending between and interconnecting the cup portion of the mounting bracket and the tube of the inner portion, the isolation assembly further having an upper portion surrounding the tube of the inner portion and disposed above the lower portion.

2. A body mount in accordance with claim 1, wherein the lower portion is rubber and the upper portion is microcellular polyurethane.

3. A body mount in accordance with claim 1, wherein a height of the cup portion is generally equal to a height of the outer recessed portion.

4. A body mount in accordance with claim 1 further comprising:
a tube ring disposed around the outer recessed portion of the tube.

5. The body mount in accordance with claim 4, wherein the tube is made of metal.

6. The body mount in accordance with claim 5, wherein the tube ring is made of plastic.

7. A body mount in accordance with claim 1, wherein the tube includes a top edge, and the outer recessed portion includes a top edge, and the top edge of the tube is a predetermined distance from the top edge of the outer recessed portion.

8. A body mount comprising:
a mounting bracket configured to mount to the frame of a vehicle, the mounting bracket having a cup portion;
a tube configured to mount to a vehicle body, the tube extending through the cup portion of the mounting bracket, the tube having an upper section and a lower section, the tube including an inner main portion and an inner recessed portion, the inner recessed portion located at an upper end of the tube;
an isolation assembly having a lower portion extending between and interconnecting the cup portion of the mounting bracket and the lower section of the tube, the isolation assembly further having an upper portion surrounding the upper section of the tube, the upper portion having a bottom surface contacting an upper surface of the lower portion; and
an end washer disposed at the upper end of the tube and contacting the upper section of the tube, the end washer further having a protruding center portion, the protruding center portion disposed within the inner recessed portion.

9. A body mount in accordance with claim 8, wherein the lower portion is rubber and the upper portion is microcellular polyurethane.

10. A body mount in accordance with claim 8, wherein a height of the cup portion is generally equal to a height of the lower portion.

11. The body mount in accordance with claim 8, wherein the tube is made of metal.

12. A body mount in accordance with claim 8 further comprising:
a tube ring disposed around the lower section of the tube.

13. The body mount in accordance with claim 12, wherein the tube ring is made of plastic.

14. A body mount in accordance with claim 8, wherein the lower section of the tube extending through the cup portion further having an outer recessed section.

15. A body mount in accordance with claim 14, wherein the outer recessed section of the tube includes a top edge, and the upper end of the tube extending through the cup portion is a predetermined distance from the top edge of the outer recessed section.

* * * * *